Nov. 5, 1935.  F. H. McCULLOUGH  2,020,073
FAIR LEAD PULLEY
Filed Sept. 24, 1934  2 Sheets-Sheet 1
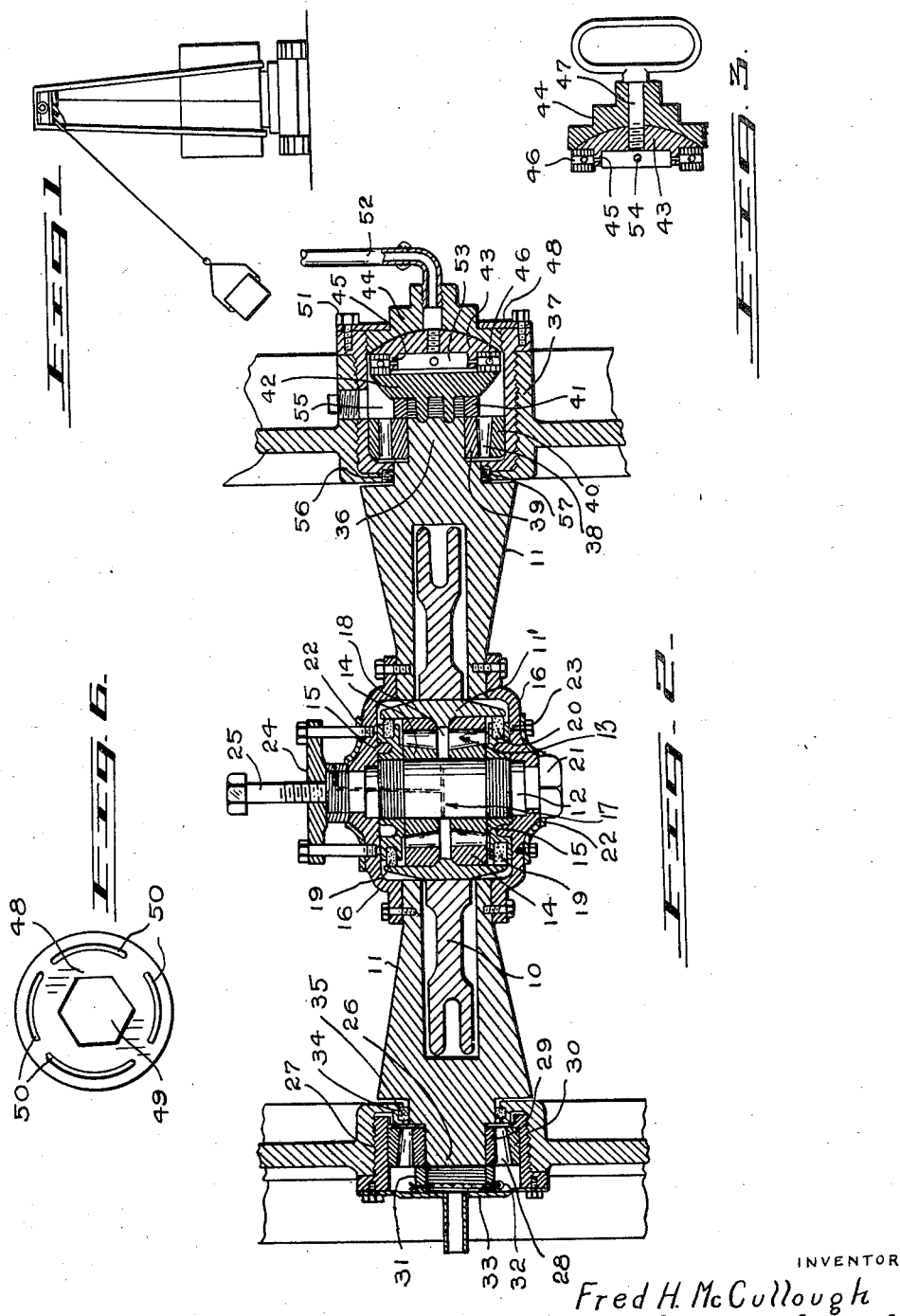

Nov. 5, 1935.   F. H. McCULLOUGH   2,020,073
FAIR LEAD PULLEY
Filed Sept. 24, 1934   2 Sheets-Sheet 2
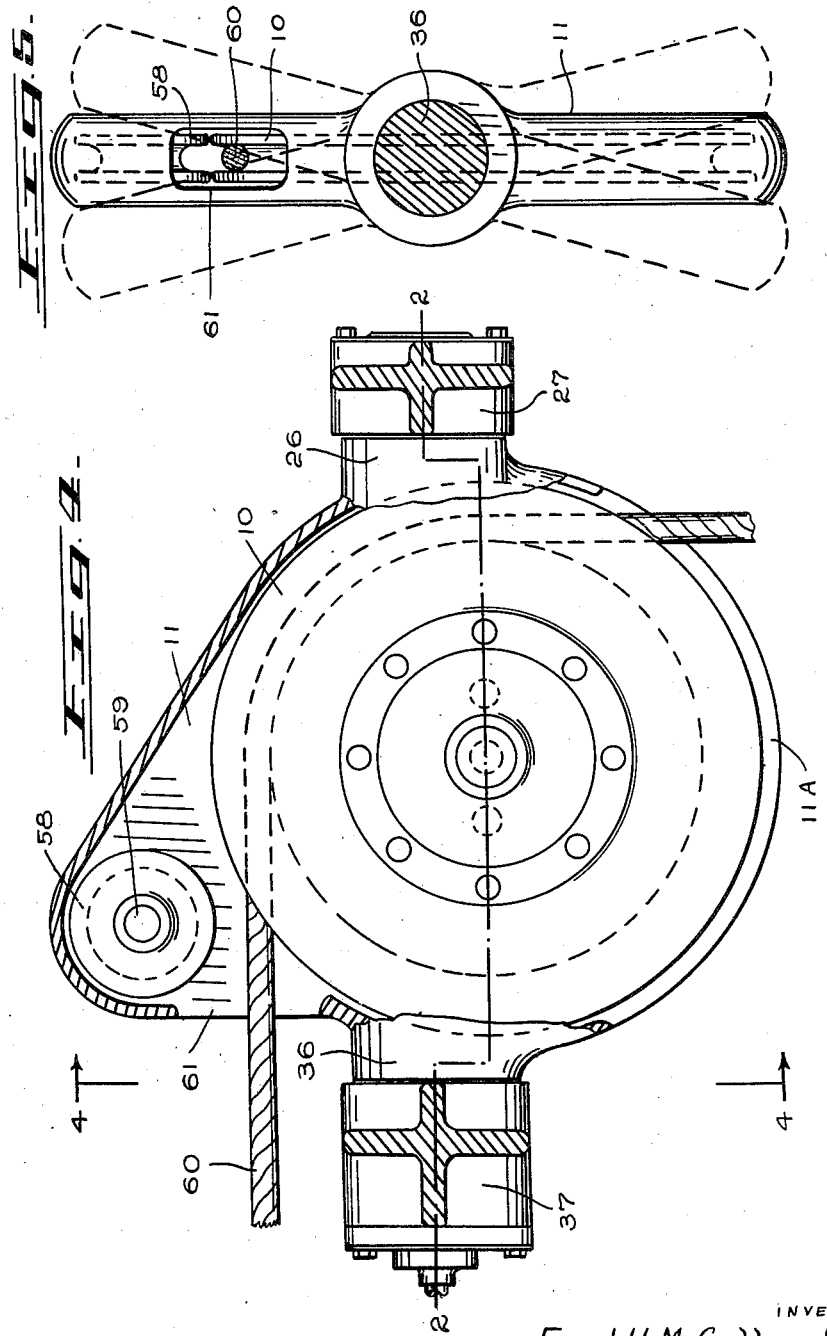
INVENTOR
Fred H. McCullough
By Ralph Burch
Attorney Patented Nov. 5, 1935

2,020,073

UNITED STATES PATENT OFFICE 2,020,073

FAIR LEAD PULLEY

Fred H. McCullough, Sacramento, Calif.

Application September 24, 1934, Serial No. 745,341
In Canada June 18, 1934

2 Claims. (Cl. 254—190)

This invention relates to improvements in a pulley and more particularly designed to be used as a "Fair lead pulley," on a swinging boom or derrick, though the invention is not limited in its use as such.

The primary object of the invention is to provide a pulley or sheave that will permit the rope or cable passing over the pulley to swing laterally and thus follow the bucket as the boom swings from side to side, thus permitting the cable to run straight through the pulley and avoid wear and tear incident to a cable extending at an angle to the pulley and extending over the wall of the pulley groove.

A further object of the invention is to provide a pulley of this character in which the pulley proper is mounted within a housing on anti-friction bearings having lubricating means therefor.

A still further object of the invention is to provide a pulley of this character wherein the said pulley housing is formed with trunnions at each end mounted in anti-friction bearings and means supplying forced lubrication thereto.

With these and other objects in view that may appear while the description proceeds the invention consists in the novel construction and arrangement of parts as hereinafter more specifically set forth, claimed and shown in the accompanying drawings forming part of this specification and in which—

Fig. 1 is a diagrammatic front elevation of a derrick with a boom at an inclination and my fair lead pulley applied to the boom.

Fig. 2 is a longitudinal section through the pulley and bearings on the line 2—2 of Fig. 4.

Fig. 3 is a detailed view of the thrust bearing removed from the housing.

Fig. 4 is a sectional elevation of the pulley and housing.

Fig. 5 is an end elevation substantially on the line 4—4 of Fig. 3,

Fig. 6 is a detail view of the thrust bearing adjusting nut retainer plate.

Referring more in detail to the drawings in which similar reference characters designate corresponding parts throughout the several views it will be seen the invention comprises a pulley 10 within a pulley housing 11. Said pulley housing extends radially therefrom to form trunnions to be hereinafter described. The said pulley is mounted on a hub 11' which is in turn rotatably mounted on a fixed pulley shaft 12 through the medium of anti-friction roller bearings 13 positioned within internal and external race rings 14 and is adjusted and retained centrally in the housing by the adjusting nuts 15 threaded on the said pulley shaft. Closure caps 16 are provided and secured to the pulley housing on each side thereof to retain the pulley shaft in position, said shaft being concentrically mounted therein. Provision is made for oiling the bearings and comprises a duct 17 in the shaft extending laterally thereof and radially from the center into an oil reservoir 18. Oil retaining rings 19 are mounted in convenient annular grooves 20 in the periphery of the adjusting nuts 15. The pulley shaft is provided with a hexagonal head 21 and a retaining collar 22 having a hexagonal orifice therein and bolted to the cap 16 by bolts 23 to prevent the said shaft from rotating which would interfere with the bearing adjustment thereof.

In order to remove the pulley hub the cap on one side is removed and the bolts 23 on the other side are removed. A brace member 24 is attached thereto and a bolt 25 which threadably engages the same is screwed therethrough to bear against the end of the shaft and force the same outward. This will force the hub out of the pulley and thus permit the same to be removed through the lower slot 11a in the pulley housing.

As previously stated the pulley housing is extended radially to form trunnions. The outer trunnion 26 is mounted in a bearing 27 supported in the frame work of the supporting structure. Said bearing comprises a race of anti-friction roller bearings 28 positioned between an inner ring 29 and an outer ring 30. An adjusting nut 31 is threaded on the outer end of the trunnion 36 whereby the adjustment is made and a cotter pin 32 provided to secure the same after adjustment is made. A cap 33 is secured over the end of the bearing by means of which the movable parts may be removed for replacement. An oil retaining ring 34 is positioned in an annular groove 35 on the inner end of the bearing to prevent the oil escaping therefrom.

The inner trunnion 36 is rotatably mounted in an inner bearing 37 supported in the frame work of the structure and comprises a race of anti-friction roller bearings 38 positioned between an inner ring 39 and an outer ring 40. An adjustment nut 41 is threadably mounted on the end of the trunnion 36 whereby the same may be adjusted laterally and the roller bearing rings retained in position. A conical member 42 is connected to the end of the said trunnion 36 forming the rotary part of a thrust bearing. A corresponding member 43 having a convex face forms the stationary part of the said thrust bearing and is retained in position concentrically and laterally by an adjusting nut 44 which is threaded into the inner truss bearing 37. On the inside of the said member 43 is an annular flange 45 around which a race of ball bearings 46 is positioned and retained concentrically thereby. A centrally disposed orifice is provided in the adjusting nut 44 and thrust bearing member 43 primarily for the purpose of lubrication but is also used to remove the said members. An eye bolt 47 being screwed therein as shown in Fig. 3 assists in withdrawing the same when the adjusting nut is unscrewed. The adjusting nut is retained in its correct adjusted position by means of the retainer 48 having a hexagonal orifice 49 therein to engage the hexagonal portion of the nut. Concentric bolt slots 50 permit a prescribed adjusting movement before the bolts 51 are tightened after which the adjustment is set and locked thereby. Lubrication may be of the forced or pressure type and fed through the oil feed pipe 52 into the space 53 from which it will pass through ducts 54 to the bearings 46 and on through the race to the outer space 55 thereby lubricating the roller bearings 38 on the trunnion. An oil retaining ring 56 is provided and is positioned in an annular groove 57 in the end of the bearing.

In the upper part of the pulley housing is an auxiliary pulley 58 rotatably mounted on a shaft 59 supported and secured in the side walls of the said housing. Said pulley is positioned at a height to permit the cable 60 to pass through the orifice 61 straight onto the pulley 10. Should the cable 60 vibrate excessively the auxiliary pulley will come into play and prevent the said cable rubbing on the side of the orifice or the flanges of the pulley.

While I have designed this sheave or pulley with special reference to its use on swinging booms or derricks, I do not wish to be limited to this as a swivel pulley of this character may be applied to other devices and wherever a swivel pulley may conveniently displace a stationary pulley so that the pulley may swing to lateral movements of the cable to thus permit the cable to run in a straight line at all times and prevent it running over the edge of the pulley or sheave. When this pulley or sheave is used in connection with a boom, it is obvious that the pulley will swing on its longitudinal axis in conformity with the swinging of the bucket or derrick line. This not only reduces very greatly the wear and tear on the cable but it prevents all chance of the cable running off of the pulley and jamming.

It is to be noted that my sheave is hung so that the axis of the pulley or sheave itself is only slightly below the axis of the trunnions so that the upper portion of the pulley and of the housing balances to some extent the lower portion of the pulley or housing. As a result of this, the sheave or pulley 10 will not "ride" on the cable when the pulley is turned angularly upon the trunnions 26 and 36. Were the trunnions 26 and 36 disposed in line with the upper portion of the housing 11, the relatively heavy weight of the lower portion of the pulley below the trunnions would tend to cause it to swing to a vertical position and the cable as a consequence rides against the outer flange of the pulley, causing great friction and great wear. This wear is very great because of the fact that these sheaves weigh in the neighborhood of 150 to 250 lbs. With my pulley having the trunnions disposed on a line, only slightly above the axis of the pulley 10 there will be no creeping of the cable to the upper edge or any other edge of the flange to the pulley itself.

Attention is called to the fact that the longitudinal trunnions of this pulley are off center so that the sheave will automatically swing back to its normal position when strain upon the cable is released. The felt oil retaining rings are, of course, for the purpose of retaining oil or grease and to make the bearings dust-proof.

While I have illustrated certain details of construction and arrangements of parts which I have found to be particularly effective, I do not wish to be limited to these, as obviously the structure might be varied in some respects without departing from the spirit of the invention as defined in the appended claims.

I claim:—

1. A pulley housing having concentric openings in the side walls thereof, closure caps for said openings, a pulley shaft disposed axially of said openings and fixedly mounted in said caps, a pulley having a central tubular hub mounted on said shaft, anti-friction bearings disposed between said shaft and hub, adjusting collars threaded on said shaft at opposite ends of said hub, said collars having peripheral packing rings in frictional contact with the walls of said hub to retain lubricant therein, trunnions formed integral with said housing at opposite ends thereof, tubular bearing housings for said trunnions, anti-friction bearings between said trunnions and housings, one of said trunnions having a flared end portion, a thrust bearing disposed against said flared end portion, a stationary member for holding said thrust bearing in position and an adjusting nut threaded in the end of the bearing housing, in which the thrust bearing is disposed, to permit adjustment thereof.

2. A pulley housing having concentric openings in the side walls thereof, closure caps for said openings, a pulley shaft disposed axially of said openings and fixedly mounted in said caps, a pulley having a central tubular hub mounted on said shaft, anti-friction bearings disposed between said shaft and hub, adjusting collars threaded on said shaft at opposite ends of said hub, said collars having peripheral packing rings in frictional contact with the walls of said hub to retain lubricant therein, trunnions formed integral with said housing at opposite ends thereof, said trunnions being disposed at right angles to the axis of said shaft, tubular housings for said trunnions, anti-friction bearings between said trunnions and housings, one of said trunnions having a flared end portion, a thrust bearing disposed against said flared end portion, an adjusting nut threaded in the end of the bearing housing adjacent said thrust bearing having a concaved recess in its inner face, a member seated in the recess of said adjusting nut for engagement with said thrust bearing and means for retaining said adjusting nut in adjusted position.

FRED H. McCULLOUGH.